(12) United States Patent
Lam

(10) Patent No.: US 6,601,263 B1
(45) Date of Patent: Aug. 5, 2003

(54) MULTIPLE PURPOSE SCRAPING IMPLEMENT FOR CLEANING SURFACES

(76) Inventor: Lucilo Lam, 280 Wickerberry Hollow, Roswell, GA (US) 30075

( * ) Notice: Subject to any disclaimer, the term of this patent is extended or adjusted under 35 U.S.C. 154(b) by 360 days.

(21) Appl. No.: 09/633,892

(22) Filed: Aug. 7, 2000

(51) Int. Cl.[7] .......................... A47L 17/06; A47L 13/02; B25D 3/00; B26B 3/00
(52) U.S. Cl. .................. 15/236.09; 30/169; 15/236.01; 15/236.05; 15/236.07; 15/236.08
(58) Field of Search ..................... 15/236.01, 236.05, 15/236.06, 236.07, 236.08, 236.09, 104.04; D32/46; 30/169, 170, 171, 172, 173; D8/11, 9; 294/9, 10; 172/380

(56) References Cited

U.S. PATENT DOCUMENTS

| 666,633 A | * | 1/1901 | Farmer | 30/169 |
|---|---|---|---|---|
| 2,133,087 A | * | 10/1938 | Ericsson | 30/320 |
| 2,824,323 A | * | 2/1958 | Tos et al. | 15/105 |
| 3,000,452 A | * | 9/1961 | Adams | 172/372 |
| 4,422,206 A | * | 12/1983 | Brace et al. | 15/236.02 |
| 4,958,403 A | * | 9/1990 | Martin | 15/236.07 |

* cited by examiner

*Primary Examiner*—Robert J. Warden, Sr.
*Assistant Examiner*—Laura C Cole
(74) *Attorney, Agent, or Firm*—Dowell & Dowell, P.C.

(57) ABSTRACT

A tool for scraping and cleaning articles having varied surface characteristics wherein the tool includes a cleaning head defined by upper and lower oppositely oriented concavely arcuate edges which intersect at opposite sides of the tool head in converging pointed tips. Notches of different sizes are provided centrally of the upper and lower edges and the head is reinforced by a rearwardly extending neck which, in a preferred embodiment, includes a pair of spaced notches oriented rearwardly of a rear face of the head and toward a handle of the tool.

12 Claims, 3 Drawing Sheets

FIG.5
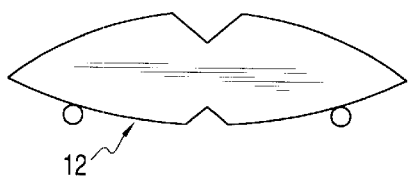
FIG.6
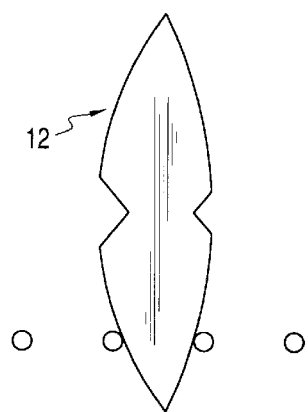
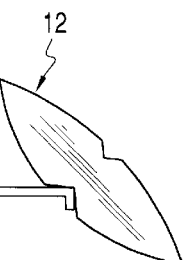
FIG.7
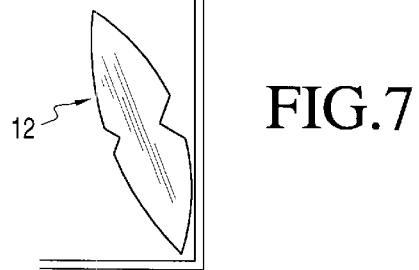
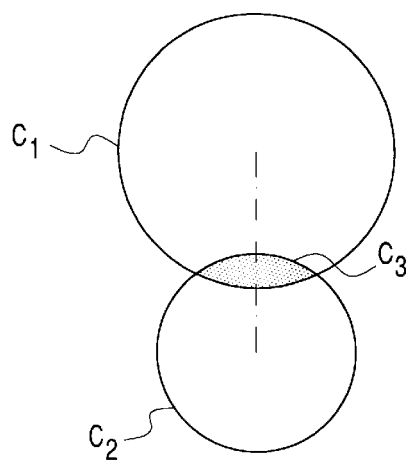
FIG.8
FIG.9
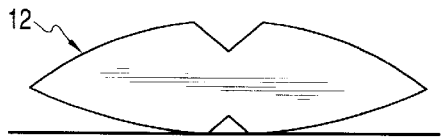

MULTIPLE PURPOSE SCRAPING IMPLEMENT FOR CLEANING SURFACES

BACKGROUND OF THE INVENTION

1. Field of the Invention

This invention is generally directed to scraping and cleaning tools or implements and more particularly to such a tool that can be utilized to clean a variety of surfaces regardless of configuration including flat surfaces, rounded edges such as encountered with rods, wires or pipes, inside and outside corners and the like.

2. Brief Discussion of the Related Art

There have been many tools developed over the years for cleaning surfaces soiled by foreign materials which are used in everyday home environments such as surfaces of cages, barbecue grills, pipes, tubes, corners and edges of pots and pans, and other articles having hard to reach surfaces. Picnic, camping and backyard barbecue grills are favorites for gathering of friends and relatives for special occasions. Various scrapers and brushes have been designed to facilitate cleaning of the wire racks associated with grills of all types, unfortunately, it often requires a number of different tools to adequately clean the wire framework associated with outdoor cooking grills.

Other household items which frequently require cleaning are wire elements and intricate corners of cages which are utilized to house dogs, cats and other family pets. Cleaning of the bars when closely spaced is very difficult and tight corner areas associated with cages frequently require the use of make-shift tools for scraping purposes and which are not totally effective for removing material from very hard to reach areas.

Numerous scraping and cleaning implements have also been specifically structured to facilitate cleaning of pots and pans used in kitchens. Unfortunately, many such implements have limited use and are not effective in removing burnt on or hard to remove materials found in the corners or edges or groves in bakeware, pots and pans and other cookware.

Other areas frequently requiring the use of scraping and cleaning tools are molding, window trim, and other surfaces of interior and exterior walls and building structures which frequently need to be repainted or resurfaced. Although numerous types of scraping and cleaning implements have been specifically designed for sanding and removal of old paint and other materials from wall surfaces, many such conventional implements are not satisfactory for use in scraping and cleaning decorative trim and uniquely configured surface areas.

In view of the foregoing, there remains a need to provide a cleaning tool which has universal application for cleaning all types of surfaces including flat surfaces, curved surfaces, inside and outside edges or corners, bars, rods and other surface configurations.

SUMMARY OF THE INVENTION

The present invention is directed to a tool for scraping and cleaning a variety of surfaces which includes a scraping head having upper and lower generally convex arcuate scraping edges which communicate at opposite sides of the tool head in the form of pointed tips. The scraping head is mounted transversely with respect to an axis of an elongated handle, the length of which may be varied depending upon the design and use. In a preferred embodiment, the cleaning head is mounted generally perpendicularly with respect to the elongated axis of the tool handle.

The tool head also includes a notch formed preferably generally centrally of each of the upper and lower scraping edges. In a preferred embodiment the notch in the upper edge is of a different dimension than the notch formed in the lower edge such that different types of surfaces can be cleaned utilizing each of the notches. The notches may be formed in a "V" or "U" shaped or other similar configuration such that the notches may be used to clean various types of outside corners or round surfaces such as found on wires, rods, bars and pipes.

In one embodiment of the invention, a reinforcing neck is mounted along the rear face of the scraping head and extends toward the handle. In some embodiments the neck may be integrally formed with the handle. The neck may, in some embodiments, include outwardly extending flanges in which notches may be provided for purposes of cleaning generally circular surfaces such as wires, rods and the like. The notches formed in the flanges associated with the reinforcing neck of the tool are oriented generally rearwardly of the scraping head and are thus defined in a plane which is transverse to the plane of the notches associated with the scraping head.

In a further preferred embodiment of the invention, the upper and lower convex scraping edges of the head of the tool are defined by segments of arcs of circles which overlap one another and which have different diameters such that the curvature of the upper edge of the scraping head differs from that of the lower edge.

A primary object of the present invention to provide a scraping and cleaning implement which is designed for hand use which can be utilized to scrape not only flat surfaces, but inside and outside corners, surfaces of bars, rods, wire and the like utilized in grills and cages, corners of pots and pans and the like and other surfaces which are unique in configuration.

It is the further object of the present invention to provide a scraping and cleaning tool or implement wherein different surface configurations can be cleaned by manipulation of the cleaning head of the tool such that different edges of the tool are oriented for different surfaces.

BRIEF DESCRIPTION OF THE DRAWINGS

A better understanding of the invention will be had with respect to the following description and the attached drawings wherein;

FIG. 4 is a front perspective illustrational view showing the tool of the present invention utilized to clean adjacent vertical bars associated with a cage or the like;

FIG. 5 is a front illustrational view showing the tool utilized for tool cleaning spaced rods;

FIG. 6 is a view of the tool oriented to clean between spaced wires or rods;

FIG. 7 is an illustrational view of the tool used to clean inside and outside corners of a container;

FIG. 8 is a view showing a preferred manner of generating the shape of the scraping head of the tool, and;

FIG. 9 is a view showing the tool being used to scrape a generally flat surface.

DESCRIPTION OF THE PREFERRED EMBODIMENT

Figure 1:
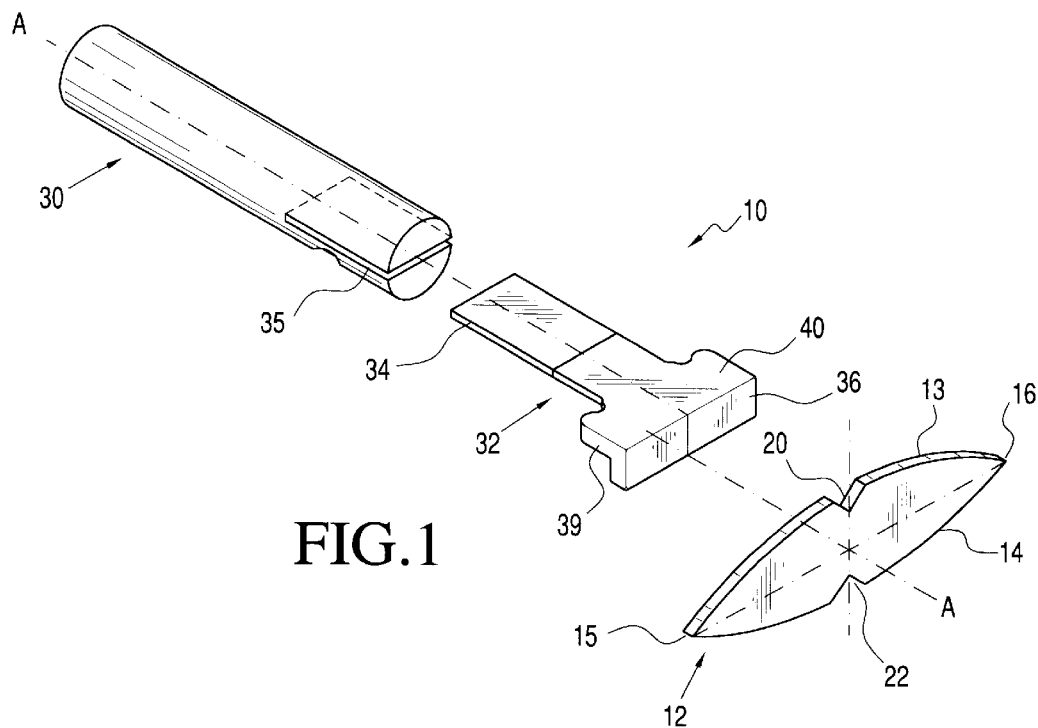
FIG. 1 is an assembly view of one embodiment of scraping tool in accordance with the teachings of the present invention.

With continued reference to the drawing figures, the scraping and cleaning implement 10 of the present invention is shown in a preferred embodiment as including a scraping head 12 having a upper scraping surface or edge 13 which is shown as being generally arcuate and convex in configuration and a lower scraping surface or edge 14 which is also generally arcuate and convex and which upper and lower scraping edges converge at the sides of the head 12 to define scraping points 15 and 16. In the preferred embodiments shown, the scraping head includes generally planer front and rear surfaces. In some embodiments the surface configurations may vary.

Figure 2:
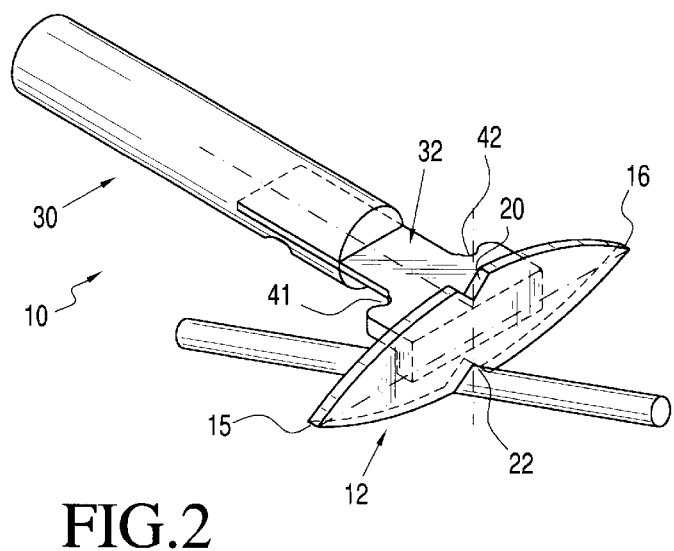
FIG. 2 is a front illustrational view of the scraping instrument disclosed in FIG. 1 showing the use of the instrument in scraping a bar.

To provide increased utility, in a preferred embodiment of the invention, as shown in FIGS. 1 and 2, the scraping head 12 further includes a first notch 20 formed generally centrally along the upper edge 13 thereof. In the drawing figures, the notch is shown as being generally "V"-shaped in configuration. In some embodiments, the configuration may also be somewhat "U"-shaped in configuration. The lower scraping edge 14 is also provided with a second notch 22 along the central portion thereof which, as shown in the drawing figures, may be also "V"-shaped in configuration. Other configurations such as "U"-shaped may also be used.

In the preferred embodiment of the invention the notch 20 is shown as being somewhat smaller in dimension than notch 22. It is desired to provide notches of different sizes so that the utility of the scraping tool may be increased so that different sizes of articles and surfaces can be scraped utilizing a single tool.

With specific reference to FIG. 2, an enlarged view is shown. In the embodiment, it is noted that the upper and lower edges are somewhat squared to provide a greater area of contact between the scraping edges and an article being cleaned. However, the edges may be beveled to more of a cutting edge. The exact configuration of the scraping edge may thus be varied and yet remain within the teachings of the present invention.

It should be noted that the arcuate segment defined by the upper edge 13 is different than the arcuate segment defined by the lower scraping edge 14. Again, it is desired to provide different surface configurations between the upper and lower scraping edges to increase the utility of the tool. Thus, in a preferred embodiment, the upper and lower edges are defined by different arc segments. With respect to FIG. 8, the preferred shape of the upper and lower edges are defined by overlapping imaginary circles $C_1$ and $C_2$ having a different radius such that the portions that overlap at $C_3$ define a configuration for the shape of the head of the implement.

The head of the scraping tool is designed to be mounted to an elongated handle 30 such that a plane of the head extends transverse to an elongated axis A—A of the handle. Preferably, the angle should be approximately 90°. The scraping head 12 is connected to the handle by way of a neck member 32 which extends therebetween. In the embodiment shown in the drawings, the neck has an extension portion 34 which enters a slot 35 provided in the handle. The handle may be formed of a different material from the head and the connecting neck to facilitate ease of handling and comfort. Therefore, the handle may be formed of a plastic or rubber type material while the scraping head and the connecting neck are preferably formed of metal.

Figure 4:
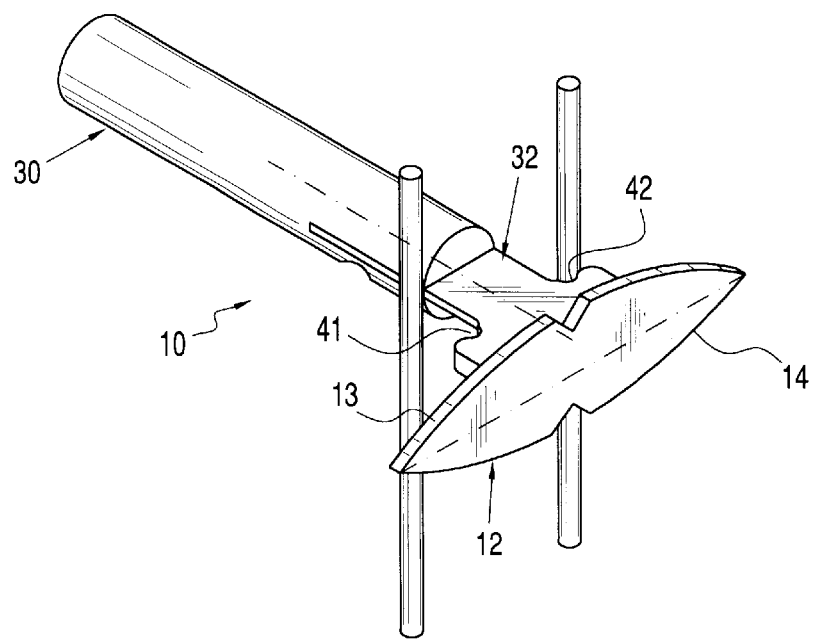

The neck in a preferred embodiment may include an "L" shaped member having a first portion 36 which is permanently secured to the rear face of the scraping head. An extension portion 34 extends therefrom to the handle 30. A pair of outwardly extended flanges 39 and 40 are integrally formed with the extension portion and a pair of spaced notches 41 and 42 are formed in the flanges oriented toward the handle 30 of the tool. These notches may be utilized for cleaning of vertical bars and wires as is shown in FIG. 4, of the drawings. It should be noted that the notches 41 and 42 are oriented generally perpendicularly with respect to the notches 20 and 22 formed in the scraping head 12 of the tool. The notches 41 and 42 are also preferably of different sizes.

Figure 3:
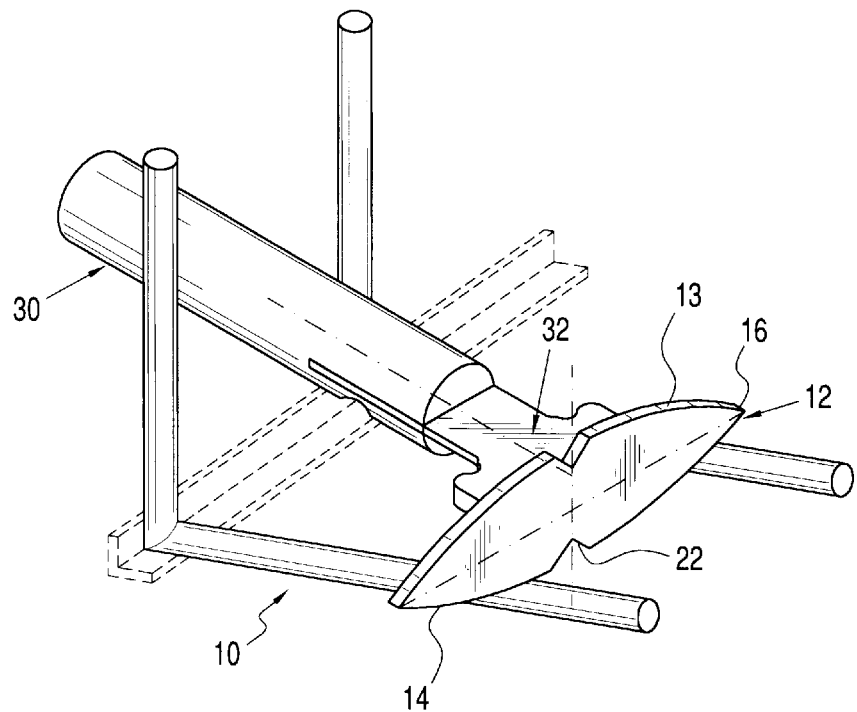
FIG. 3 is a front perspective illustrational view showing the use of the tool shown in FIG. 1 for cleaning space bars such as found in a cage or grill.

With particular reference to FIG. 2, an illustration is shown wherein the notch 22 is being utilized to clean or scrape the surface of a rod. By rotating the tool 180°, the notch 20 may be utilized to scrape a smaller wire. With respect to FIG. 3, the tool has been retained in a position shown in FIG. 2, but is utilized for scraping the surfaces of adjacent rods. By inverting the tool to place notch 22 at the top of the scraping head, the different arcuate surface of the upper edge 13 of the tool may be utilized to clean adjacent wires as shown in FIG. 5. By rotating the tool 90° from the position shown in FIG. 3, both the upper and lower scraping edges may be utilized to clean between wires and rods.

With reference to FIG. 7, the implement is shown for cleaning inside and outside corners of sinks, pots and pans, and other types of containers. With respect to FIG. 9, the tool is shown as being used to clean generally flat surfaces.

Again, in the preferred embodiment, the upper and lower scraping edges of the scraping head are defined by different arcuate segments thereby increasing utility by allowing one or the other edge to be utilized to engage a particular surface to be treated. Further, the notches associated in the upper and lower edges are preferably of different sizes to again add utility to the scraping implement.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

I claim:

1. A scraping and cleaning tool for use on surfaces of varied configurations which tool comprises a head having upper and lower arcuate and convex scraping edges which intersect with one another at opposite sides of the head to define oppositely oriented side scraping points, at least one of said upper and lower edges having a first scraping notch formed therein centrally located between said side scraping points, and means for connecting said head to a handle such that a plane defined by said upper and lower scraping edges extends transversely with respect to an elongated axis of said handle.

2. The scraping and cleaning instrument of claim 1 including a second notch formed in the other of said upper and lower scraping edges and positioned central of said side scraping points.

3. The scraping and cleaning implement of claim 1 in which said upper and lower scraping edges are defined along overlapping arc segments of two opposing circles each having a different radius such that said upper and lower scraping edges have differing curvatures.

4. The scraping and cleaning tool of claim 3 including a second notch formed in the other of said upper and lower scraping edges and positioned centrally to said side scraping points.

5. The scraping and cleaning tool of claim 4 wherein said head includes front and rear surfaces and said means for connecting including a neck member extending from said rear surface of said head toward said handle, said neck including at least one flange extending outwardly from a side thereof and a notch formed in said at least one flange and oriented away from said rear surface of said scraping head and toward said handle.

6. The scraping and cleaning tool of claim 5 wherein said neck includes oppositely oriented side flanges, each of said side flanges having a notch formed therein oriented away from said rear surface of said head toward said handle.

7. The scraping and cleaning tool of claim 6 in which said notches in said side flanges of said neck are of different sizes.

8. The scraping and cleaning tool of claim 4 wherein said first and second notches in said upper and lower scraping edges are of different sizes.

9. The scraping and cleaning tool of claim 6 wherein said neck is "L"-shaped and having a portion mounted to said rear surface of said head so as to thereby reinforce said head and a second portion extending toward said handle.

10. The scraping and cleaning tool of claim 2 in which said first and second notches are different sizes.

11. The scraping and cleaning tool of claim 10 in which said notches are "V"-shape.

12. The scraping and cleaning tool of claim 10 in which said head is oriented perpendicularly to said elongated axis of said handle.

* * * * *